United States Patent
Black et al.

(10) Patent No.: US 11,328,130 B2
(45) Date of Patent: May 10, 2022

(54) TRANSLATIONAL BOT FOR GROUP COMMUNICATION

(71) Applicant: Orion Labs, San Francisco, CA (US)

(72) Inventors: Justin Black, San Francisco, CA (US); Gregory Albrecht, San Francisco, CA (US); Dan Phung, San Francisco, CA (US)

(73) Assignee: Orion Labs, Inc., San Francisco, CA (US)

( * ) Notice: Subject to any disclaimer, the term of this patent is extended or adjusted under 35 U.S.C. 154(b) by 0 days.

(21) Appl. No.: 16/182,474

(22) Filed: Nov. 6, 2018

(65) Prior Publication Data

US 2019/0138605 A1     May 9, 2019

Related U.S. Application Data

(60) Provisional application No. 62/582,000, filed on Nov. 6, 2017.

(51) Int. Cl.
*G06F 40/58*     (2020.01)
*G10L 13/08*     (2013.01)
*H04L 65/403*    (2022.01)

(52) U.S. Cl.
CPC ............ *G06F 40/58* (2020.01); *G10L 13/086* (2013.01); *H04L 65/403* (2013.01)

(58) Field of Classification Search
CPC ....................................................... G06F 40/58
See application file for complete search history.

(56) References Cited

U.S. PATENT DOCUMENTS

| | | | | |
|---|---|---|---|---|
| 9,614,969 B2* | 4/2017 | Aue | ........................ | G06F 40/58 |
| 2002/0169592 A1* | 11/2002 | Aityan | ..................... | G06F 40/58 704/2 |
| 2004/0172257 A1* | 9/2004 | Liqin | ...................... | G10L 13/00 704/277 |
| 2004/0267527 A1* | 12/2004 | Creamer | .................. | G10L 15/26 704/235 |
| 2008/0077390 A1* | 3/2008 | Nagao | ...................... | G10L 15/28 704/7 |
| 2008/0300852 A1* | 12/2008 | Johnson | ................... | G06F 40/58 704/2 |
| 2009/0099836 A1* | 4/2009 | Jacobsen | ................. | G06F 40/58 704/3 |
| 2009/0132230 A1* | 5/2009 | Kanevsky | ............... | G06F 40/58 704/2 |
| 2010/0135478 A1* | 6/2010 | Wald | ....................... | H04M 3/56 379/202.01 |

(Continued)

*Primary Examiner* — Jialong He

(57) ABSTRACT

The present disclosure is directed to systems, methods and devices for providing real-time translation for group communications. A speech input may be received from a first group communication device associated with a first language. One or more groups to distribute the speech input may be determined, wherein each of the one or more groups comprises at least one group communication device associated with a language that is different than the first language. The received speech input may be translated into a corresponding language for each of the one or more groups, and the translated speech may be sent to each group communication device of the one or more groups in a language corresponding to each of the one or more groups.

20 Claims, 4 Drawing Sheets

(56) References Cited

U.S. PATENT DOCUMENTS

| | | | |
|---|---|---|---|
| 2010/0223048 A1* | 9/2010 | Lauder | G06F 40/47 704/4 |
| 2011/0246172 A1* | 10/2011 | Liberman | G06F 40/58 704/2 |
| 2011/0282645 A1* | 11/2011 | Khuda | H04L 51/063 704/3 |
| 2014/0043430 A1* | 2/2014 | Yu | H04L 67/1046 348/14.08 |
| 2014/0337007 A1* | 11/2014 | Waibel | G10L 13/02 704/3 |
| 2015/0154183 A1* | 6/2015 | Kristjansson | H04M 3/568 704/3 |
| 2015/0339294 A1* | 11/2015 | Travieso | G06F 40/58 704/2 |
| 2015/0363389 A1* | 12/2015 | Zhang | G06F 40/58 704/2 |
| 2017/0295454 A1* | 10/2017 | Albrecht | H04L 65/605 |

* cited by examiner

TRANSLATIONAL BOT FOR GROUP COMMUNICATION

RELATED APPLICATION(S)

This application is a Non-Provisional Patent Application of, and claims priority to U.S. Provisional Patent Application No. 62/582,000, filed Nov. 6, 2017, entitled "TRANSLATIONAL BOT FOR GROUP COMMUNICATION," which application is incorporated herein by reference in its entirety.

BACKGROUND

Advances in group voice communication technology, including voice over IP (VoIP), has made it possible for users spread across vast distances to converse with one another without having to be physically near one another. While distance amongst users has become increasingly easy to overcome using such technologies, it remains difficult to have conversations over distributed voice communication systems in scenarios where users are attempting to converse in more than one language. In such scenarios it is often necessary to have translators present, which can break down the flow and speed in which real-time group conversations take place.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods, and devices for providing real-time translation for group communications. Aspects described herein provide mechanisms for determining a language that a speech input received from a first group communication is received in and further determining whether one or more group communication devices that the received speech input is to be sent to have a language preference associated with them that is different from the determined language for the speech input.

In some examples, the one or more group communication devices that the received speech input is to be sent to may be identified based on a group communication service account associated with the group communication device that sent the speech input. The group communication service account may include a plurality of IP addresses and/or other group communication device identifiers (e.g., MAC addresses, device serial numbers, Bluetooth addresses, IMEI numbers, etc.) corresponding to one or more group communication devices of a distribution group (e.g., the group communication devices that the received speech input is to be sent to). A group communication service account for each group communication device in the distribution group may also be identified and, based on each corresponding account, a preferred language may be identified for each group communication device of the distribution group. A translation engine, or translation bot, may translate the received speech input into a language for each group communication device of the distribution group that has a preferred language that is determined to be different than the language in which the speech input was received in. The translated speech input may then be sent to each group communication device of the distribution group for which a translation was required to match the language of the speech input to a preferred language setting.

DETAILED DESCRIPTION

Figure 1:
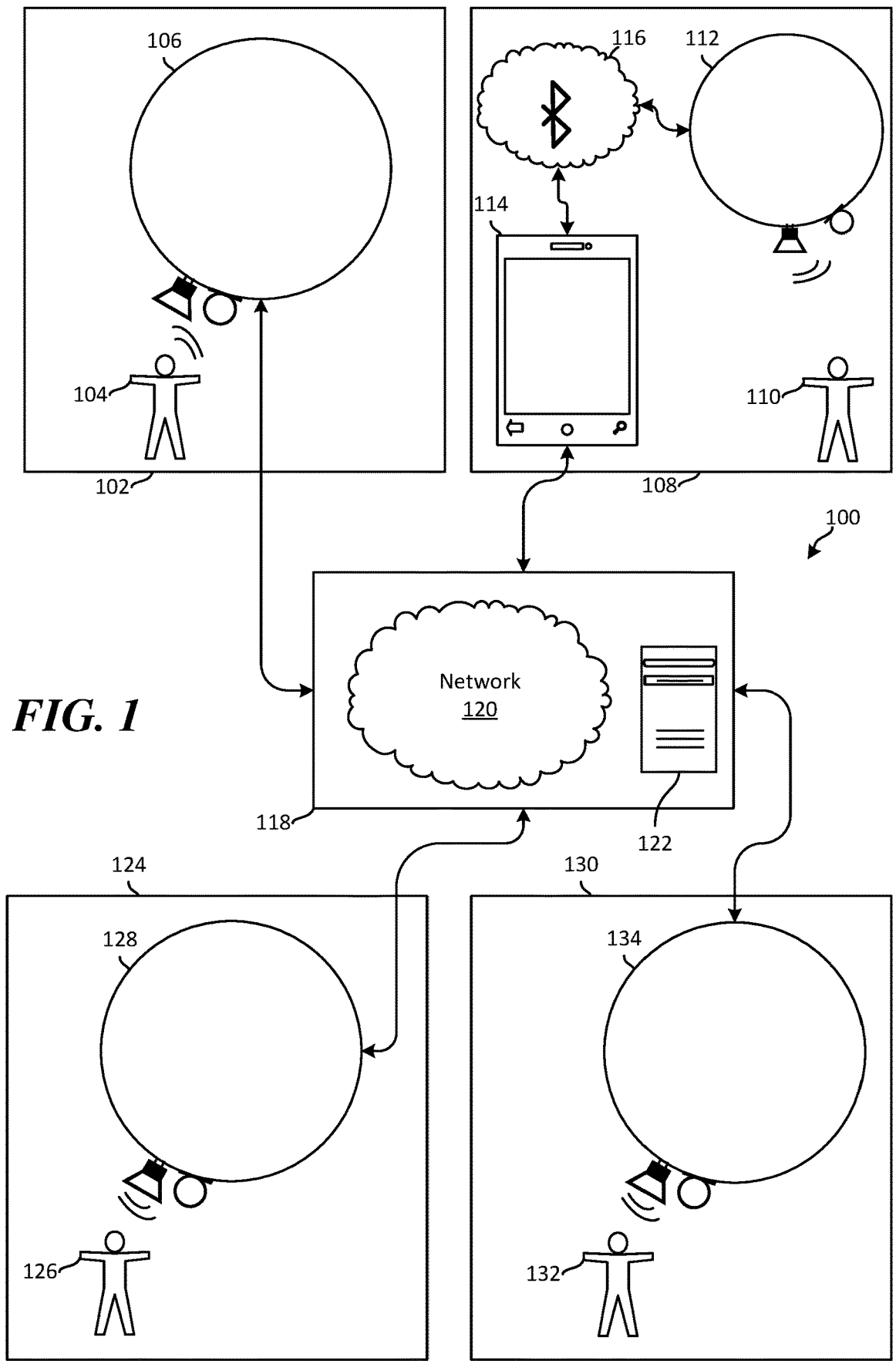
FIG. 1 is a schematic diagram of an exemplary environment for providing real-time translation for group communications amongst a plurality of group communication devices and users having different language preferences.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to systems, methods and devices for providing real-time translation for group speech communications. According to examples, a plurality of group communication device users may utilize individual group communication devices to communicate with one another. Each group communication device may be associated with a corresponding user. For example, each user may register a corresponding group communication device with a group communication service implemented on a remote management platform, and personalize information related to their accounts and/or devices, including a preferred reception language (i.e., a language that they would like to receive voice communications in from the device and from other users), a preferred outgoing language (i.e., a language they are likely to input into their corresponding group communication device), one or more communication groups and corresponding users/devices associated with a primary group communication setting on the group communication device (i.e., one or more users that the account user would like her voice communications to be transmitted to when a primary setting is in effect), and one or more communication groups and corresponding users/devices associated with one or more secondary group communication settings on the group communication device (i.e., one or more users that the account user would like her voice communications to be transmitted to when a secondary setting is in effect). In some examples, a user may initiate a voice communication transmission session with a primary group utilizing a singular push to talk operation on the user's group communication device. In additional examples, a user's preferred reception language and/or a user's preferred outgoing language may be automatically determined based on natural language processing and/or machine learning performed on one or more speech inputs received by the remote management platform from one or more of the user's group communication devices.

According to aspects, a user may suppress a button on a group communication device during a transmission from the user to the user's primary group, or a user may maintain physical contact with a portion of the group communication device during a transmission from the user to the user's primary group. In additional examples, a user may initiate a voice communication transmission session with a secondary group by double tapping on a push to talk button on the group communication device, or touching a portion of the group communication device twice when the user would like to transmit recorded audio content to members of the user's secondary group. Other mechanisms may be utilized in performing transmission operations to primary and secondary groups, such as voice transmission activation, and gesture transmission activation.

When a group communication device user initiates a group communication session with one or members of the user's groups (e.g., a primary group or a secondary group), the group communication device may record sound originating from the user and the user's surrounding area during a recording time period and transmit the recorded sound to a remote management platform. The remote management platform receives the recording, as well as an IP address and/or other group communication device identifier (e.g., MAC address, device serial number, Bluetooth address, IMEI number, etc.) associated with the user's group communication device. The received IP address and/or other group communication device identifier may be matched against an account log of the remote management platform, to determine one or more settings, such as those discussed above (e.g., preferred reception language, preferred outgoing language, a primary group of users corresponding to a user's primary communication group, and one or more secondary group of users corresponding to one or more of the user's secondary communication groups). In some examples, upon matching the IP address and/or other group communication device identifier to a user's account and determining at least one group of users to provide the recorded sound to, the remote management platform may similarly determine one or more account settings for each user in the at least one group of users to provide recorded audio to, as well as a corresponding IP address and/or other group communication device identifier for each of those users' group communication devices which may be utilized in directing the recorded audio to. In determining one or more account settings for each user in the at least one group of users to provide the recorded sound to, the remote management platform may determine a preferred reception language for each user, and process the recorded audio utilizing one or more language translation engines, or translation bots, such that recorded speech from the transmitting user is translated, if need be, into a preferred language for each user of the one or more groups.

FIG. 1 is a schematic diagram of an exemplary environment 100 for providing real-time translation for group communications amongst a plurality of group communication devices and users having one or more different language preferences. Exemplary environment 100 includes first communication environment 102, second communication environment 108, third communication environment 124, fourth communication environment 130, and network communication and processing environment 118.

First communication environment 102 includes user 104 and group communication computing device 106. Second communication environment 108 includes user 110, group communication computing device 112, and LTE-enabled computing device 114, which may communicate one or more recorded audio packets with one another via BLE network 116. Third communication environment 124 includes user 126 and group communication computing device 128. Fourth communication environment 130 includes user 132 and group computing device 134.

Each of the group communication computing devices in exemplary environment 100 typically include at least some form of computer readable media. Computer readable media includes any available media that can be accessed by an associated group communication computing device. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by an associated group communication computing device. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

User 104 may provide an audio input to a microphone integrated with group communication computing device 106. In some examples, user 104 may turn group communication device 106 on, and activate audio collection, via one or more integrated microphones, by suppressing the surface of group communication computing device 106 such that an activation button is suppressed, and audio may then be recorded by group communication computing device 106. Audio recording may cease upon user 104 no longer pressing on the surface of group communication device 106. In some examples, in addition or alternative to recording audio communications upon suppression/non-suppression of the surface of group communication computing device 106, audio may be dynamically processed and streamed based on timing of the suppression/non-suppression of the surface of group communication computing device 106. In yet other examples, rather than suppressing and/or not suppressing the surface of group communication computing device 106 to facilitate the recording and/or streaming of audio to group communication computing device 106, one or more alternative input mechanisms may be employed to accomplish the same. For example, a button may be pressed, a touch sensor may be activated, a voice command may be received, a gesture may be received, etc.

Upon receiving the audio input from user 104, an audio encryption and/or encoding engine may process the received audio into one or more packets in a secure operating environment of group communication computing device 106 and transfer those packets to a normal operating environment of group communication device 106 for LTE transfer and processing at a remote management platform via network 120. In some examples, the remote management platform may perform one or more matching operations for matching one or more IP addresses and/or other group communication device identifier from one or more group communication devices to one or more account settings corresponding to those devices and one or more primary and/or secondary groups and associated group communication devices for distributing communications to. In additional examples, the remote management platform may comprise one or more translation bots for translating audio content received from one or more group computing devices into one or more languages corresponding to preferred languages for users and devices associated with one or more distribution groups (e.g., a primary distribution group, a secondary distribution group, etc.).

In some examples, the processing of the received audio content by an audio encryption and/or encoding engine may comprise analyzing the audio content and parsing it into one or more messaging packets in a format such as one or more Opus codec packets, each of which may comprise N audio packet fragments. Additionally, the processing of the received audio content from user 104 may comprise packaging the audio content from its native format, into one or more formats that may be transferred from group communication computing device 106 to one or more additional group communication computing devices, via a network, such as network 120.

Upon receiving the processed audio content, group communication computing device 106 may send one or more encoded packets, via an LTE modem and network 120, comprising the processed audio content to one or more server computing devices, such as server computing device 122, comprising a remote management platform and one or more translation bots for translating the audio content from a first language into one or more additional languages corresponding to user preferences of one or more group communication computing devices that the audio content is to be distributed to. The one or more packets sent to the remote management platform may comprise an IP address and/or other group communication device identifier corresponding to the group communication computing device 106, which may be matched by the remote management platform against a group communication list for that specific IP address and/or other group communication device identifier.

The group communication list may comprise a plurality of additional IP addresses and/or other group communication device identifiers, one or more of which may be linked to the IP address and/or other group communication device identifier for group communication computing device 106. That is, group communication computing device 106 may be associated, via the remote management platform, with one or more additional group communication computing devices such that when user 104 provides audio to group communication computing device 106, that audio is encoded, sent to the remote management platform, via network 120, and transferred from server computing device 122 to the one or more additional group communication computing devices to which it is associated with.

In addition to determining one or more additional group communication computing devices to transfer the received audio content to based on the IP address and/or other group communication device identifier associated with group communication computing device 106, preferred language settings for each of those group communication computing devices that the audio is to be transferred to may also be determined from accounts associated with those devices and their corresponding IP addresses and/or other group communication device identifiers. Thus, each of group communication computing devices 106, 112, 128 and 134 may have a preferred language setting associated with them, which may be the same or different than each other group communication computing device. In examples where one or more of group communication computing devices 112, 128, and 134 have a different preferred language setting associated with them than the language that the received audio content from computing device 106 is received in, a language translation engine, or translation bot, corresponding to each additional different language may translate the received audio content from group communication computing device 106 prior to sending it to a corresponding group communication computing device (e.g., group communication computing devices 112, 128 and 134).

According to some examples, group communication device 106 may include a transport layer security (TLS) layer comprising one or more of: an encryption engine for obfuscating the encoded audio communication received from user 104 to server computing device 122; an authentication engine for authenticating the identify of group communication computing device 106 to server computing device 122 and/or authenticating the identify of server computing device 122; and a communication integrity engine for preventing message loss and/or alteration during transfer of the audio communication to server computing device 122.

In exemplary environment 100, the audio communication received from user 104 may be sent, via network 120, to each of the group communication devices in second communication environment 108, third communication environment 124, and fourth communication environment 130. Specifically, an LTE communication comprising the audio content from group communication computing device 106 may be received by LTE-enabled computing device 114 in second communication environment 108, and subsequently transferred to group communication computing device 112, via BLE network 116. If encrypted, the audio content my then be decrypted by group communication computing device 112 and an associated decryption engine. The audio content may similarly be decoded for audio playback by group communication computing device 112 and an associated decoding engine, and played back via a speaker associated with group communication computing device 112 such that user 110 receives the audio that was received and sent from group communication computing device 106.

In various embodiments, the types of networks used for communication between the computing devices that makeup the present invention include, but are not limited to, an Internet, an intranet, wide area networks (WAN), local area networks (LAN), virtual private networks (VPN), cellular networks, and additional satellite based data providers such as the Iridium satellite constellation which provides voice and data coverage to satellite phones, pagers and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

In exemplary environment 100, an LTE signal comprising the audio content received from user 104, and corresponding group communication computing device 106, may be received by LTE modems of group communication computing devices 128 and 134. If encrypted, the LTE signals comprising the received audio may be decrypted by a decryption engine in each of group communication computing devices 128 and 134. Similarly, the LTE signals comprising the received audio may be decoded for audio playback by each of group communication computing devices 128 and 134, and played back via speakers associated with group communication computing devices 128 and 134, such that users 126 and 132 receive the audio that was sent from group communication computing device 106.

Figure 2:
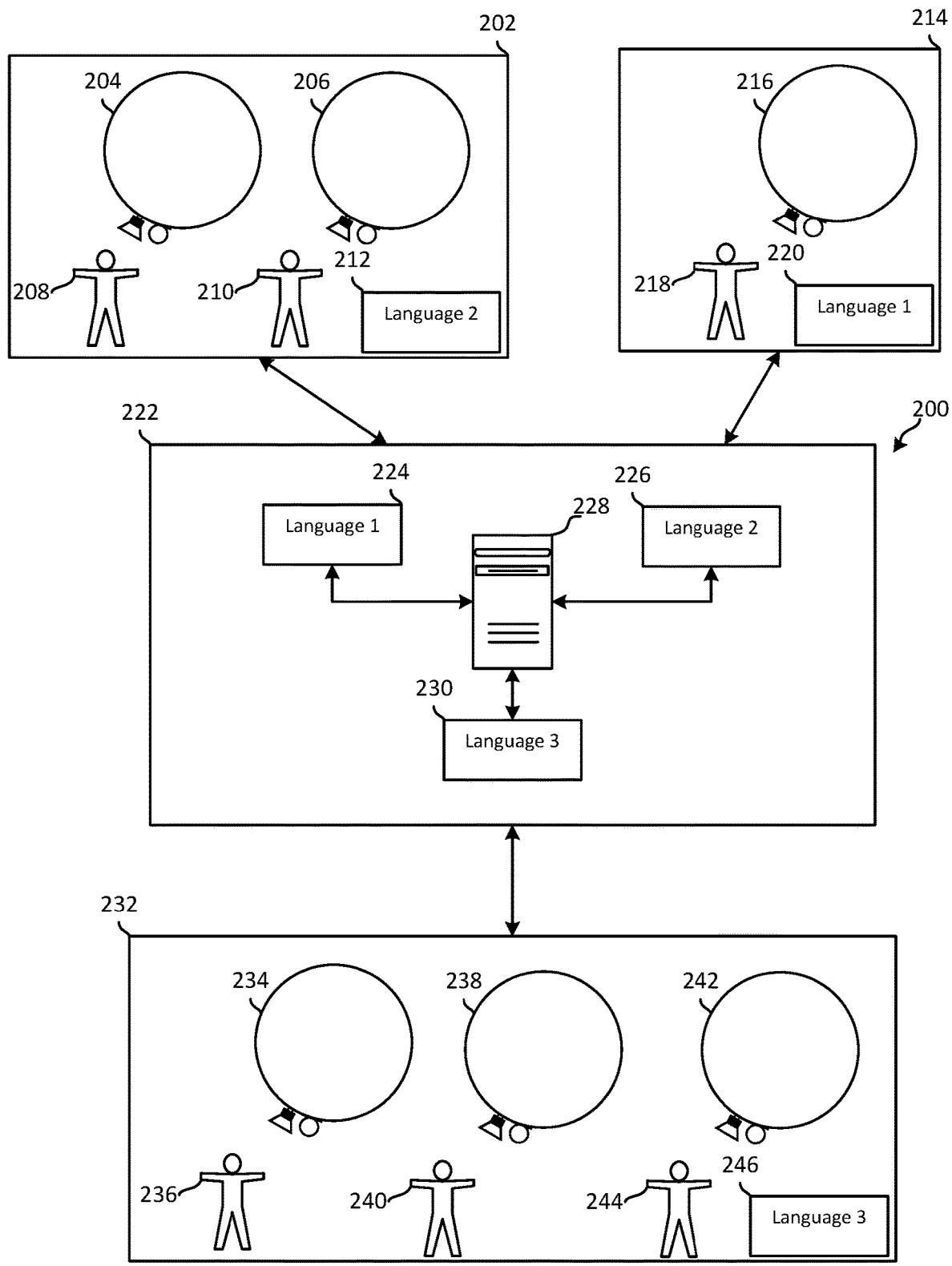
FIG. 2 is a simplified block diagram of an exemplary environment for providing real-time translation for group communications to a plurality of language groups.

FIG. 2 is a simplified block diagram of an exemplary environment 200 for providing real-time translation for group communications to a plurality of language groups. Exemplary environment 200 includes first language environment 214, second language environment 202, remote management platform environment 222, and third language environment 232.

First language environment 214 includes user 218, group communication device 216, and preferred language one 220. Preferred language one 220 is a preferred language associated with user 218 and group communication computing device 216. That is, the remote management platform 228 in remote management platform environment 222 may store information related to one or more group communication devices associated with user 218, such as group communication computing device 216, including a preferred communication language (i.e., preferred language one 220) for user 218, as well as a primary communication group for user 218, and in some examples one or more secondary communication groups for user 218.

In some examples, the preferred language associated with user 218 may be a setting that user 218 manually inputs into an account associated with remote management platform 228. In other examples, the preferred language associated with user 218 may be automatically determined based on performing one or more of machine learning and/or natural language processing on one or more voice/speech input recordings received by remote management platform 228 from user 218 and corresponding group communication computing device 216.

For exemplary purposes, preferred language one 220 will be described in relation to FIG. 2 as being English, although it should be understood that preferred language one 220 may comprise a language other than English, such as Spanish, German, Russian, Swedish, Italian, French, Japanese, Chinese, Korean, etc. Regardless, for the purpose of the description of FIG. 2, preferred language one 220 is a different language than each of preferred language two 212 and preferred language three 246.

Second language environment 202 includes user 208 and corresponding group communication device 204, user 210 and corresponding group communication device 206, and preferred language two 212. Preferred language two 212 is a preferred language associated with users 208 and 210 and corresponding group communication devices 204 and 206. That is, the remote management platform 228 in remote management platform environment 222 may store information related to one or more group communication devices associated with users 208 and 210, such as group communication devices 204 and 206, including a preferred communication language (i.e., preferred language two 212) for each of users 208 and 210, as well as primary and secondary communication groups for users 208 and 210.

In some examples, the preferred language associated with users 208 and 210 may be based on a setting that those users manually input into an account associated with remote management platform 228. In other examples, the preferred language associated with users 208 and 210 may be automatically determined based on performing one or more of machine learning and/or natural language processing on one or more speech input recordings received by remote management platform 228 and group communication devices associated with users 208 and 210 (e.g., group communication devices 204 and 206).

For exemplary purposes, preferred language two 212 will be described in relation to FIG. 2 as being Spanish, although it should be understood that preferred language two 212 may comprise a language other than Spanish, such as English, German, Russian, Swedish, Italian, French, Japanese, Chinese, Korean, etc. Regardless, for the purpose of the description of FIG. 2, preferred language two 212 is a different language than each of preferred language one 220 and preferred language three 246.

Third language environment 232 includes user 236 and corresponding group communication device 234, user 240 and corresponding group communication device 238, user 244 and corresponding group communication device 242, and preferred language three 246. Preferred language three 246 is a preferred language associated with users 236, 240 and 244 and corresponding group communication devices 234, 238 and 242. That is, the remote management platform 228 in remote management platform environment 222 may store information related to one or more group communication devices associated with users 236, 240 and 2444, such as group communication devices 234, 238 and 242, including a preferred communication language (i.e., preferred language three 246) for each of users 236, 240 and 244, as well as primary and secondary communication groups for users 236, 240 and 244.

In some examples, the preferred language associated with users 236, 240 and 2444 may be based on a setting that those users manually input into an account associated with remote management platform 228. In other examples, the preferred language associated with users 236, 240 and 2444 may be automatically determined based on performing one or more of machine learning and/or natural language processing on one or more speech input recordings received by remote management platform and group communication devices associated with users 236, 240 and 244 (e.g., group communication devices 234, 238 and 242).

For exemplary purposes, preferred language three 246 will be described in relation to FIG. 2 as being Chinese, although it should be understood that preferred language three 246 may comprise a language other than Chinese, such as English, Spanish, German, Russian, Swedish, Italian, French, Japanese, Korean, etc. Regardless, for the purpose of the description of FIG. 2, preferred language three 246 is a different language than each of preferred language one 220 and preferred language two 212.

In some aspects, a primary communication group and/or one or more secondary communication groups associated with user 218 and group communication device 216 may be associated with group communication platform 228 based on a setting that user 218 manually inputs into an account associated with remote management platform 228. In a specific example, user 218 may have a primary communication group associated with user 218's group communication account on remote management platform 228 comprising user 208 and corresponding group communication device 204, user 210 and corresponding group communication device 206, user 236 and corresponding group communication device 234, user 240 and corresponding group communication device 238, and user 244 and corresponding group communication device 242.

In an example where user 218 provides a voice input to group communication device 216, that input may be recorded by group communication device 216 and sent in one or more audio packets to remote management platform 228. Remote management platform 228 may analyze the one or more audio packets, as well as metadata associated with the one or more audio packets and information associated with group communication device 216. The received metadata and/or information associated with group communication device 216 may include an IP address and/or other group communication device identifier corresponding to group communication device 216. The remote management platform 228 may match the IP address and/or other group communication device identifier associated with group communication device 216 to a group communication service account, and in so doing, determine that the received audio content corresponds to a group communication account associated with user 218. The remote management platform 228 may further determine, from the group communication account associated with user 218, that the audio content received from group communication device 216 should be sent to a primary communication group associated with user 218's account. That is, the primary communication group for user 218's account may comprise a plurality of IP addresses and/or other group communication device identifiers corresponding to group communication devices that the audio content should be sent to. In this example, the primary communication group for user 218 comprises each of group communication devices 204 and 206 in second language environment 202, and each of group communication devices 234, 238 and 242 in third language environment 232.

In addition to determining which group communication devices to send the received audio content from group communication device 216 to, remote management platform 228 may determine whether the received audio content from group communication device 216 should be directed to one or more language translation engines, or translation bots, prior to being sent to one or more of the group communication devices comprising the primary communication group associated with user 218's account. That is, a group communication account corresponding to each of group communication devices 204 and 206 in second language environment 202, and each of group communication devices 234, 238, and 242 in third language environment 232, may be identified by remote management platform 238 based on their corresponding IP addresses and/or other group communication device identifiers, and a determination may be made as to a preferred communication language associated with each of those accounts.

As described above, each of group communication devices 204 and 206 and their associated group communication accounts have a preferred language of Spanish, which is different from preferred language one 220 (e.g., English), and each of group communication devices 234, 238 and 242 and their associated group communication accounts have a preferred language of Chinese, which is different from preferred language two 212 (e.g., Spanish) and preferred language one 220 (e.g., English). As such, remote management platform may direct the received audio content from group communication device 216, which was received in English, to a Spanish translation language engine, or translation bot, prior to sending it to group communication devices 204 and 206 in second language environment 202. Likewise, remote management platform 228 may direct the received audio content from group communication device 216 to a Chinese translation language engine, or translation bot, prior to sending it to group communication devices 234, 238 and 242 in third language environment 232. Upon translating the received speech from group communication device 216 into the preferred language associated with each of group communication devices 204 and 206 (e.g., Spanish), the translated audio content may be sent to those devices in one or more translated audio packets, which may then be played back in the translated format to users 208 and 210, respectively. Likewise, upon translating the received speech from group communication device 216 into the preferred language associated with each of group communication devices 234, 238 and 242 (e.g., Chinese), the translated audio content may be sent to those devices in one or more translated audio packets, which may then be played back in the translated format to users 236, 240 and 244, respectively.

Figure 3:
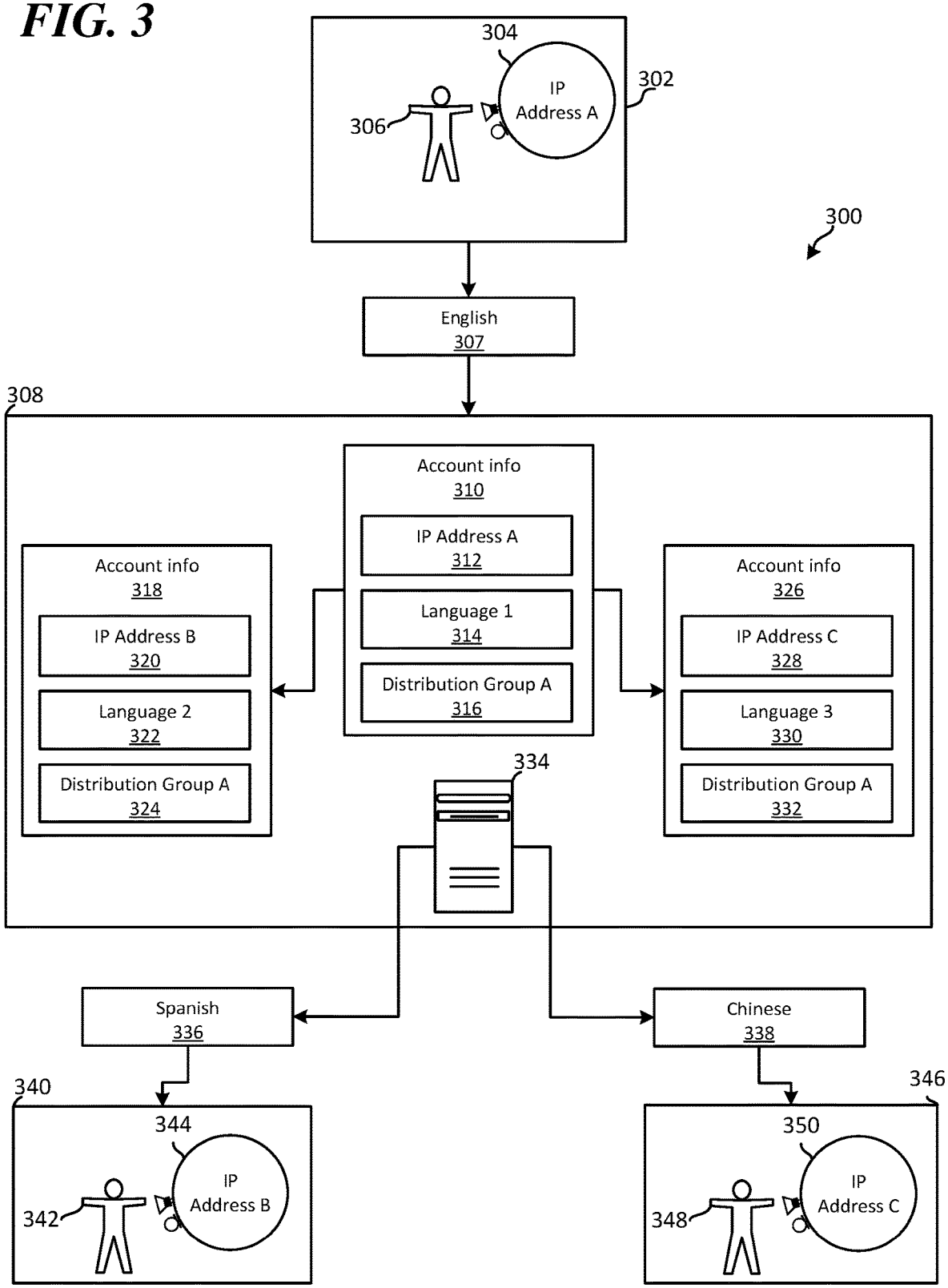
FIG. 3 is a simplified block diagram of an exemplary environment for providing real-time translation from a first group communication device and associated user with a first language preference to first and second groups, each of the first and second groups comprising group communication devices and users associated with language preferences that are different from the first language preference.

FIG. 3 is a simplified block diagram of an exemplary environment 300 for providing real-time translation from a first group communication device and associated user with a first language preference to first and second groups, each of the first and second groups comprising group communication devices and users associated with language preferences that are different from the first language preference. Exemplary environment 300 includes first language environment 302, remote management platform environment 308, second language environment 340, and third language environment 346.

First language environment 302 includes user 306 and corresponding group communication device 304. User 306 may initiate recording by group communication device 304, by pressing on a record button on group communication device 304, and speaking in a first language, such as the preferred language associated with user 306's group communication account integrated with remote management platform 334 in remote management platform environment 308. Upon recording the voice communication from user 306, group communication device 304 may send the voice communication in the recorded English language format (e.g., English transmission 307), via one or more audio packets, to a remote management platform, such as remote management platform 334.

Upon receiving the voice communication in the recorded English language format (e.g., English transmission 307), remote management platform 334 may identify an IP address and/or other group communication device identifier associated with the transmission corresponding to group communication device 304, and further identify a group communication account associated with that IP address and/or other group communication device identifier. In this example, group communication device 304 has IP address A associated with it, and remote management platform 334 may identify account information 310 based on matching IP address A against a list of group communication accounts and their associated IP addresses. Thus, remote management platform 334 identifies account information 310 corresponding to group communication device 304 and user 306, and the identified account information 310 comprises IP address A 312, language one 314 (e.g., English) corresponding to an account language preference for group communication device 304 and user 306, and distribution group A 316. Distribution group A 316 may comprise one or more group communication devices to which the voice communication should be sent to based on corresponding IP addresses listed for distribution group A 316 in account information 310. In this example, distribution group A 316 comprises an IP address corresponding to group communication device 344 in second language environment 344, and an IP address corresponding to group communication device 350 in third language environment 346.

Upon identifying each of the IP addresses associated with distribution group A 316, remote management platform 334 may identify corresponding group communication accounts associated with each of those IP addresses. Thus, remote management platform 334 may identify account information 318 corresponding to IP address B 320 from distribution group A 316, and account information 326 corresponding to IP address C from distribution group A 316. Account information 318 includes an identifying IP address B 320 corresponding to group communication device 344 and user 342 in second language environment 340, as well as language two 322 (e.g., Spanish) corresponding to user 342's language preference, and an indication that IP address B 320 is part of distribution group A 316 (e.g., distribution group A 324). Similarly, remote management platform 334 may identify account information 326 corresponding to IP address C 328 from distribution group A 316. Account information 326 includes an identifying IP address C 328 corresponding to group communication device 350 and user 348 in third language environment 346, as well as language three 330 (e.g., Chinese) corresponding to user 348's language preference, and an indication that IP address C 328 is part of distribution group A 316 (e.g., distribution group A 332).

As the voice communication received from group communication device 304 is in a different language (e.g., English) than the preferred language preferences identified from account information 318 and 326 for each of group communication devices 344 and 346 (e.g., language two 322—Spanish, language three 330—Chinese), remote management platform 334 may send the English voice communication to a translation language engine, or translation bot, corresponding to the language preference for group communication device 344 prior to sending it to group communication device 344. Likewise, remote management platform 334 may send the English voice communication to a translation language engine, or translation bot, corresponding to the language preference for group communication device 350 prior to sending it to group communication device 350.

Upon translating the English voice communication into the preferred language associated with group communication device 344 (e.g., language two 322—Spanish), remote management platform 334 may send the translated voice communication 336 to group communication device 344, which may playback the translated voice communication 336 for user 342. Similarly, upon translating the English voice communication into the preferred language associated with group communication 350 (e.g., language three 350— Chinese), remote management platform 334 may send the translated voice communication 338 to group communication device 350, which may playback the translated voice communication 338 for user 348.

Figure 4:
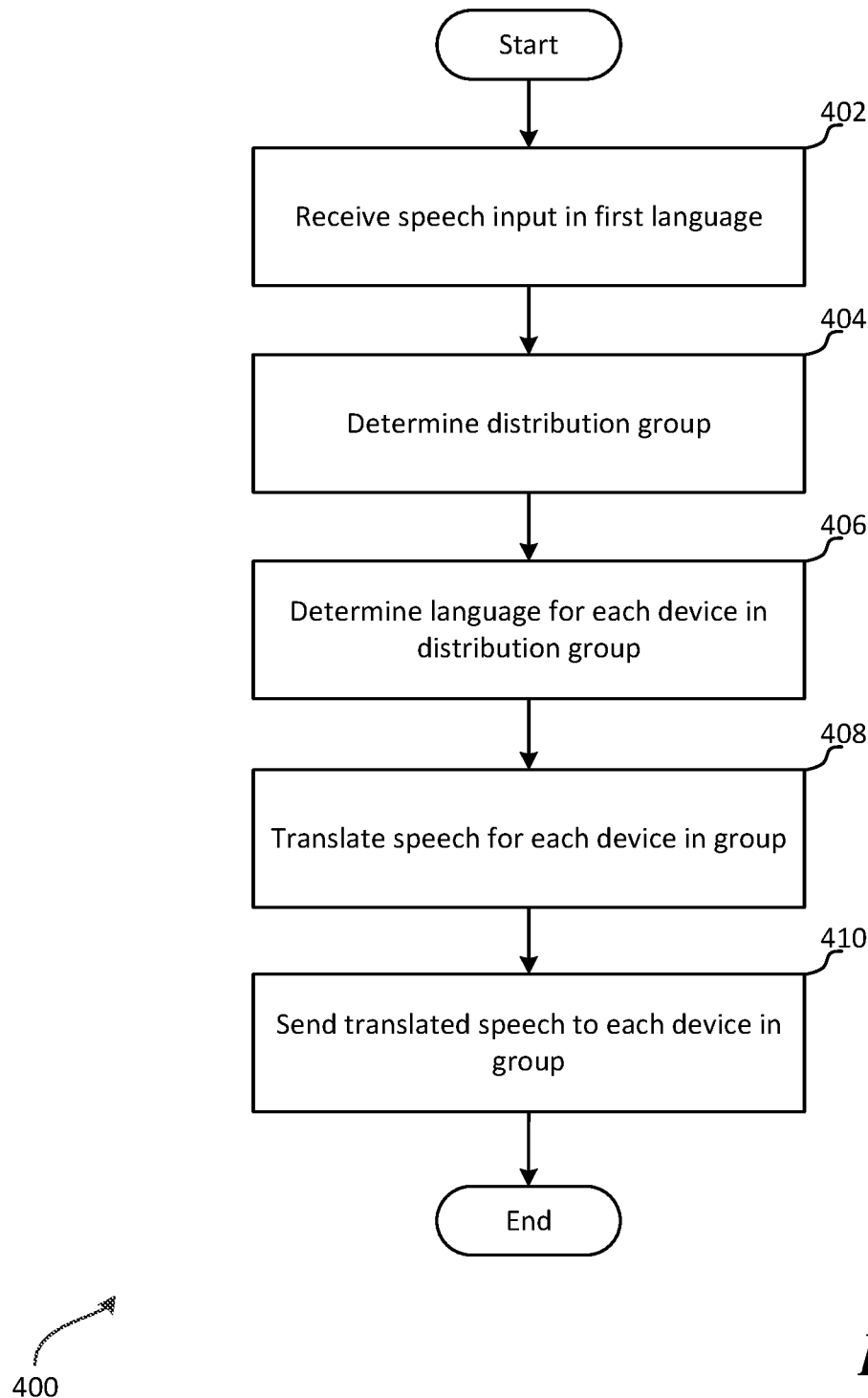
FIG. 4 illustrates an exemplary method for providing real-time translation for group communications amongst a plurality of communication devices and users having different language preferences.

FIG. 4 illustrates an exemplary method 400 for providing real-time translation for group communications amongst a plurality of communication devices and users having different language preferences. The method 400 begins at a start operation and continues to operation 402 where a speech input from a group communication computing device is received by a remote management platform. In examples, the received speech input may comprise one or more audio packets and information identifying the group communication computing device that recorded the speech input. In examples, the identifying information may comprise an IP address and/or other group communication device identifier associated with the group communication computing device.

From operation 402 flow continues to operation 404 where one or more additional group communication devices comprising a distribution group are identified for sending the received speech input to. In identifying the distribution group, the remote management platform may match identifying information associated with the group communication device that sent the speech input to the remote management platform against a list of IP addresses and/or other group communication device identifiers associated with group communication service accounts on the remote management platform. For example, a plurality of group communication accounts and corresponding users and group communication devices for those users may be registered with the remote management platform, and each account may be associated with one or more unique IP addresses and/or other group communication device identifiers corresponding to the group communication devices for each user. Each account may also be associated with one or more preferences and/or settings. The one or more preferences and/or settings may comprise: a primary distribution group, one or more secondary distribution groups, a preferred language, notification alert settings, etc. In examples, a primary distribution group may comprise one or more group communication devices that an audio transmission should be sent to upon the remote management platform receiving a transmission from a corresponding group communication device for an account which the primary distribution group setting relates to. Thus, in identifying the distribution group of group communication devices to send the received speech input to, the remote management platform identifies the group communication account associated with the transmitting group communication device based on its IP address and/or other group communication device identifier, and thereby identifies a primary distribution group for that group communication device within the account. Each group communication device comprising the identified primary distribution group is also associated with an IP address and/or other group communication device identifier in the distribution account information of the transmitting group communication device account.

Upon identifying the one or more group communication devices comprising the distribution group, the remote management platform may further identify a group communication account corresponding to each group communication device of the distribution group based on a corresponding IP address and/or other group communication device identifier.

From operation 404 flow continues to operation 406 where a preferred language is determined for each group communication device in the distribution group. That is, upon identifying corresponding accounts for each group communication device of the distribution group, the remote management platform may identify a preferred language associated with each of those accounts from account settings for each of the group communication devices. In some examples the preferred language setting for each group communication device may be a user-provided setting (e.g., a manual input setting). In other examples, the preferred language setting for each group communication device may be automatically determined based on one or more of natural language processing of one or more speech inputs from a corresponding group communication device, and/or machine learning applied to one or more speech inputs from a corresponding group communication device. In still other examples the preferred language setting may be manually determined by a third-party that is not the group communication account holder.

From operation 406 flow continues to operation 408 where the received speech input is translated into a preferred language format for each group communication device in the distribution group that has a preferred language in its account settings that is different from the language that the speech input was received in from the originating group communication device. In examples, the remote management platform may analyze the received speech input and determine that the language it was recorded in corresponds to a first language (e.g., English, Spanish, etc.), and that one or more group communication devices of the distribution group have a preferred language associated with them that is different from the first language (e.g., a second language such as Chinese, Japanese, Korean, Russian, etc.). In some examples, the language of the received speech input may be determined based on natural language processing of the received speech input by the remote management platform. In other examples, the language of the received speech input may be automatically associated with the preferred language account setting for the group communication device that sent the speech input. In examples where at least one group communication device has a corresponding preferred language setting that is different from the language determined for the received speech input (i.e., the first language), the remote management platform may send the received speech input in the first language to a translation engine corresponding to each additional language for which the speech input needs to be translated into, and the received speech input may be translated into a language format corresponding to each preferred language setting for the distribution group that is different from the first language.

From operation 408 flow continues to operation 410 where the received speech input is sent to each group communication device in the distribution group, including one or more translated speech inputs for each group communication device that has a preferred language in its account settings that is different from the language that the speech input was received in from the originating group communication device.

From operation 410 flow moves to an end operation and the method 400 ends.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:
1. A method comprising:
performing, at a remote management server configured for managing group communications between multiple communication devices, a process for providing real-time translation for group communications, including:
registering a first communication device with the remote management server, including associating the first communication device with:
a first language preference,
a primary group communication setting identifying a first set of communication devices, and
a secondary group communication setting identifying a second set of communication devices;
receiving, from the first communication device, a speech input and a first device identifier for the first communication device;
accessing an account log associated with the first communication device based on the first device identifier;
determining a plurality of communication devices to distribute the speech input to based on the primary group communications setting from the account log;
determining a preferred language associated with each of the plurality of group communication devices;
grouping each of the plurality of communication devices into one or more groups based on corresponding preferred languages, each group associated with a separate language;
for languages different from the first language preference, translating the speech input into a translated speech input corresponding to the preferred languages for each of the one or more groups prior to sending the speech input; and
sending the translated speech input to each communication device of the one or more groups.

2. The method of claim 1, wherein the first communication device is associated with the first language preference based on a user-provided language setting.

3. The method of claim 2, wherein:
the first device identifier includes an IP address associated with the first communication device; and
the remote management server determines the first language preference based on the IP address.

4. The method of claim 3, wherein the remote management server comprises a list of a plurality of IP addresses, and wherein each of the plurality of IP addresses is associated with a unique communication device and a corresponding user-provided language setting.

5. The method of claim 1, further comprising:
performing natural language processing on the speech input; and
detecting, based on the natural language processing, a language that the speech input corresponds to.

6. The method of claim 5, further comprising:
receiving separate speech inputs from each of the plurality of communication devices;
performing natural language processing on the separate speech inputs from each of the plurality of communication devices; and
detecting, based on the natural language processing, a language corresponding to each of the separate speech inputs from each of the plurality of communication devices.

7. The method of claim 1, further comprising:
parsing, by a voice messaging application, the speech input into one or more audio messaging packets; and
encoding the one or more audio messaging packets with an identification key for determining the one or more groups to distribute the speech input to.

8. The method of claim 7, wherein the one or more audio messaging packets are Opus audio codec packets and wherein each Opus audio packet includes N audio data packet fragments.

9. The method of claim 7, wherein the first communication device, and the plurality of communication devices associated with a language that is different than the first language preference, each comprise a push-to-talk audio transmission interface.

10. The method of claim 7, wherein the sending of the translated speech input in a language corresponding to each of the one or more groups comprises sending the one or more audio messaging packets to a remote management platform for distribution to the one or more groups.

11. A system comprising:
a remote management server configured for managing group communications between a plurality of group communication devices, including:
a memory for storing program code; and
a processor, functionally coupled to the memory, configured to execute the program code to perform a process for providing real-time translation for group communications, including:
register a first communication device with the remote management server based on receiving:
a first language preference,
a primary group communication setting identifying a first set of communication devices, and
a secondary group communication setting identifying a second set of communication devices;
receive, from the first communication device, a speech input and a first device identifier for the first communication device;
determine at least one communication device to distribute the speech input to based on the first device identifier;
determine a preferred language associated with corresponding each of the at least one communication device;
identify one or more groups of communication devices from the at least one communication device based on corresponding preferred languages, each group associated with a separate language different from the first language preference;
for languages different from the first language preference, translate the speech input into a translated speech input corresponding to the preferred languages for each of the one or more groups prior to sending the speech input; and
send the translated speech input to each communication device of the one or more groups.

12. The system of claim 11, wherein the first communication device is associated with the first language preference based on a user-provided language setting.

13. The system of claim 12, wherein:
the first device identifier includes an IP address associated with the first communication device; and
the remote management platform determines the first language preference based on the IP address.

14. The system of claim 13, wherein the remote management server comprises a list of a plurality of IP addresses, and wherein each of the plurality of IP addresses is associated with a unique communication device and a corresponding user-provided language setting.

15. The system of claim 14, wherein the processor is further configured to:
receive separate speech inputs from each of the at least one communication device;
perform natural language processing on the separate speech inputs from each of the at least one communication device; and
detect, based on the natural language processing, a language corresponding to each of the separate speech inputs from each of the at least one communication device.

16. A memory device storing instructions that, when executed, cause a processor to perform a method comprising:
registering a first communication device with a remote management server configured for managing group communications between a plurality of communication devices, based on receiving:
a first language preference,
a primary group communication setting identifying a first set of communication devices, and
a secondary group communication setting identifying a second set of communication devices;
receiving, from the first communication device, a speech input and a first device identifier for the first communication device;
determining, at the remote management server, at least one communication device to distribute the speech input to based on the first device identifier;
determining, at the remote management server, a preferred language associated with corresponding each of the at least one communication device;
for languages different from the first language preference, translating the speech input into a translated speech input corresponding to the preferred languages for each of the at least one communication device prior to sending the speech input; and sending, from the remote management server to the at least one group communication device, the translated speech input in a language corresponding to the at least one communication device.

17. The memory device of claim 16, wherein the first communication device is associated with the first language preference based on a user-provided language setting.

18. The memory device of claim 16, wherein:
the first device identifier includes an IP address associated with the first communication device; and
the method further comprises determining, at the remote management server, the first language preference based on the IP address.

19. The memory device of claim 18, wherein the remote management server comprises a list of a plurality of a plurality of IP addresses, and wherein each of the plurality of IP addresses is associated with a unique communication device and a corresponding user-provided language setting.

20. The memory device of claim 19, wherein the instructions are further executable by the processor for:
receiving a second speech input from each of the at least one communication device;
performing language processing on the second speech input from each of the at least one communication device; and
detecting, based on the language processing, a language corresponding to each second speech input from each of the at least one communication device.

\* \* \* \* \*